United States Patent [19]
Onan et al.

[11] Patent Number: 5,969,006
[45] Date of Patent: Oct. 19, 1999

[54] REMEDIAL WELL BORE SEALING METHODS

[75] Inventors: David D. Onan; Jiten Chatterji; Bobby J. King, all of Duncan; Roger S. Cromwell, Walters; Patty L. Onan, Duncan, all of Okla.

[73] Assignee: Halliburton Energy Services, Inc., Duncan, Okla.

[21] Appl. No.: 09/027,271

[22] Filed: Feb. 20, 1998

Related U.S. Application Data

[63] Continuation-in-part of application No. 08/914,594, Aug. 18, 1997, Pat. No. 5,873,413.

[51] Int. Cl.$^6$ .................................................. E21B 33/13
[52] U.S. Cl. .................................... 523/166; 166/276
[58] Field of Search .......................................... 523/166

[56] References Cited

U.S. PATENT DOCUMENTS

| | | | |
|---|---|---|---|
| 2,815,079 | 12/1957 | Goins, Jr. et al. | 166/29 |
| 3,082,823 | 3/1963 | Hower | 166/29 |
| 3,208,525 | 9/1965 | Caldwell et al. | 166/33 |
| 3,310,111 | 3/1967 | Pavlich et al. | 166/33 |
| 3,416,604 | 12/1968 | Rensvold | 166/33 |
| 3,467,208 | 9/1969 | Kelly | 175/72 |
| 3,750,768 | 8/1973 | Suman, Jr. et al. | 175/72 |
| 3,782,466 | 1/1974 | Lawson | 166/254 |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,072,194 | 2/1978 | Cole et al. | 166/295 |
| 4,101,474 | 7/1978 | Copeland | 260/13 |
| 4,113,015 | 9/1978 | Meijs | 166/295 |
| 4,215,001 | 7/1980 | Elphingstone et al. | 252/8.55 C |
| 4,220,566 | 9/1980 | Constien | 260/13 |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphy et al. | 166/295 |
| 4,741,401 | 5/1988 | Walles et al. | 166/300 |
| 4,785,884 | 11/1988 | Armbruster | 166/280 |
| 4,921,047 | 5/1990 | Summers | 166/276 |
| 4,972,906 | 11/1990 | McDaniel | 166/276 |
| 5,133,409 | 7/1992 | Bour et al. | 166/293 |
| 5,159,980 | 11/1992 | Onan et al. | 166/294 |
| 5,168,928 | 12/1992 | Terry et al. | 166/292 |
| 5,213,161 | 5/1993 | King et al. | 166/293 |
| 5,293,938 | 3/1994 | Onan et al. | 166/293 |
| 5,314,023 | 5/1994 | Dartez | 166/295 |
| 5,325,723 | 7/1994 | Meadows et al. | 73/794 |
| 5,335,726 | 8/1994 | Rodrigues | 166/294 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,368,102 | 11/1994 | Dewprashad | 166/276 |
| 5,373,901 | 12/1994 | Norman et al. | 166/300 |
| 5,377,757 | 1/1995 | Ng | 166/277 |
| 5,428,178 | 6/1995 | Zuzich et al. | 549/378 |
| 5,458,195 | 10/1995 | Totten | 166/293 |
| 5,547,027 | 8/1996 | Chan et al. | 166/295 |
| 5,559,086 | 9/1996 | Dewprashad | 507/219 |

FOREIGN PATENT DOCUMENTS

| | | | |
|---|---|---|---|
| 0 553 566A1 | 8/1993 | European Pat. Off. | E21B 43/04 |
| 0 802 253 A1 | 10/1997 | European Pat. Off. | C09K 7/02 |
| 1315462 | 12/1962 | France . | |
| 1019122 | 2/1966 | United Kingdom | E02D 3/14 |
| WO 91/02703 | 7/1991 | WIPO | C04B 24/24 |
| WO 94/12445 | 9/1994 | WIPO | C04B 26/18 |

OTHER PUBLICATIONS

Halliburton Services—Sales and Service Catalog No. 43, pp. 2561–2562 and pp. 2556–2557.

*Primary Examiner*—Paul R. Michl
*Attorney, Agent, or Firm*—Craig W. Roddy; C. Clark Dougherty, Jr.

[57] ABSTRACT

The present invention relates to improved methods of sealing openings in a well bore penetrating a subterranean zone into which fluids contained in the well bore are lost or from which fluids undesirably flow into the well bore. The methods basically comprise the steps of preparing a hardenable epoxy sealing composition comprising an epoxide containing liquid and a hardening agent, placing the epoxy sealing composition by way of the well bore into the openings and into the subterranean zone and allowing the epoxy composition to harden whereby the well bore is sealed.

22 Claims, No Drawings ns,006

REMEDIAL WELL BORE SEALING METHODS

RELATED U.S. APPLICATION DATA

This application is a continuation-in-part of application Ser. No. 08/914,594, filed on Aug. 18, 1997, now U.S. Pat. No. 5,873,413.

BACKGROUND OF THE INVENTION

1. Field of the Invention

The present invention relates generally to remedial well bore sealing methods, and more particularly, to improved methods of sealing openings such as channels or fractures communicating the well bore with a subterranean zone into which fluids are lost.

2. Description of the Prior Art

In the drilling of oil and gas wells using the rotary drilling method, drilling fluid is circulated through the drill string and drill bit and back to the surface by way of the well bore being drilled. The drilling fluid maintains hydrostatic pressure on the subterranean zones through which the well bore is drilled and circulates cuttings out of the well bore. The drilling fluid includes gelled and particulate material which builds up on the walls of the well bore and prevents fluid loss into subterranean zones penetrated by the well bore. However, relatively large openings such as channels, fractures, vugs and the like are often encountered which communicate the well bore with one or more porous subterranean zones. Because of the size of such openings filter cake from the drilling fluid does not seal the openings and drilling fluid is lost from the well bore into the subterranean zones. This in turn causes drilling fluid circulation to be lost whereby the drilling operations must be terminated while remedial steps are taken.

Heretofore, a variety of methods and sealing compositions have been developed and used for combating drilling fluid lost circulation problems. However, such methods and compositions have often been unsuccessful due to inadequate viscosity development by the sealing compositions used. Also, the methods of placement of the sealing compositions have been inadequate to cause plugging of the weak permeable portions of the zones being treated and to prevent bypassing of such portions by the sealing compositions and/or the wash-out of the compositions.

After a well bore penetrating a subterranean hydrocarbon producing formation has been drilled, the well bore is often completed by sealing a string of pipe such as casing or a liner in the well bore. That is, a sealing composition such as a hydraulic cement slurry is pumped into the annular space between the walls of the well bore and the exterior of the string of pipe disposed therein. The cement slurry is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented. Sometimes, however, very small openings such as holes or cracks in the well casing and/or the cement sheath are formed through which fluids can undesirably flow into or out of the well bore. Also, very small openings such as channels or fractures can be encountered in a well bore both during drilling and in the completion of the well bore through which drilling and completion fluids are lost. Because of the very small size of such openings in pipe strings, cement and/or the well bore, it is often difficult to seal the openings due to the inability of the sealing composition utilized to enter the openings.

Thus, there is a continuing need for improved methods and sealing compositions for sealing very small openings through which fluids leak into or out of the well bore as well as relatively large openings through which drilling fluid circulation is lost during drilling.

SUMMARY OF THE INVENTION

The present invention provides improved methods of sealing one or more openings in a well bore penetrating a subterranean zone into which fluids contained in the well bore are lost or from which fluids undesirably flow into the well bore. In accordance with the methods of this invention, a hardenable epoxy sealing composition comprised of an epoxide containing liquid and a hardening agent is prepared. The epoxy sealing composition has a selected viscosity at 25° C. in the range of from about 10 to about 100 centipoises and has flexibility upon hardening. The epoxy composition is then placed by way of the well bore into the openings therein and into the subterranean zone communicated therewith. Thereafter, the epoxy composition is allowed to harden whereby the well bore is sealed.

When the openings are small, the epoxy composition is pumped at an elevated pressure into the openings and the subterranean zone, i.e., the epoxy composition is squeezed into and through the openings. When the openings are relatively large and fluids are being lost into the subterranean zone, the epoxy composition is permitted to flow by hydrostatic fluid pressure differential into the openings and subterranean zone.

Depending upon the particular application involved, the epoxy sealing composition can include a particulate solid filler such as crystalline silicas, amorphous silicas, clays, calcium carbonate or barite. Also, the epoxy composition can contain lost circulation materials such as ground walnut hulls, cellophane flakes and fibrous materials.

It is, therefore, a general object of the present invention to provide improved well bore sealing methods.

Other and further objects, features and advantages of the present invention will be apparent to those skilled in the art upon a reading of the description of preferred embodiments which follows.

DESCRIPTION OF PREFERRED EMBODIMENTS

The present invention provides improved methods of sealing one or more openings in a well bore penetrating a subterranean zone into which fluids contained in the well bore are lost or from which fluids undesirably flow into the well bore. The methods basically comprise the steps of preparing a hardenable epoxy sealing composition having a selected viscosity at 25° C. in the range of from about 10 to about 100 centipoises and having flexibility upon hardening comprised of an epoxide containing liquid and a hardening agent, placing the epoxy composition by way of the well bore into the openings therein and into the subterranean zone communicated therewith and then allowing the epoxy composition to harden whereby the well bore is sealed.

When the openings are small such as holes or cracks in casing, the cement sheath between the casing and the well bore and/or in the walls of the well bore, the epoxy sealing composition is pumped at an elevated pressure into the openings and the subterranean zone, i.e., the epoxy composition is squeezed in and through the openings.

When the openings are relatively large and fluids such as completion or drilling fluids are being lost into the subterranean zone, the epoxy composition is placed in the well bore whereby it flows by hydrostatic fluid pressure differential into the openings and the subterranean zone. After being placed, the epoxy composition is allowed to harden whereby the well bore is sealed. The term "small openings" is used herein to mean openings having an effective diameter in the range of from about 0.02 to about 10 microns. The term "relatively large openings" is used herein to mean openings having an effective diameter greater than about 50 microns. The term "hydrostatic fluid pressure differential" is used herein to mean the pressure differential between the hydrostatic pressure exerted on the well bore by a column of fluid therein and the fluid pressure within the subterranean zone into which the fluids in the well bore are being lost.

The epoxy sealing compositions which are particularly useful in accordance with the present invention have low viscosities whereby they readily flow through openings in casing, liners, cement and well bores and into the pores of permeable subterranean zones communicated with the openings. Generally, such epoxy sealing compositions have a selected viscosity in the range of from about 10 to about 100 centipoises. While various low viscosity epoxide containing liquids can be used, preferred such liquids are selected from the group of diglycidyl ethers of 1,4-butanediol, neopentyl glycol and cyclohexane dimethanol. A suitable epoxide containing liquid comprised of the diglycidyl ether of 1,4-butanediol is commercially available from the Shell Chemical Company of Houston, Tex. under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentyl glycol is commercially available from Shell Chemical Company under the trade name "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from Shell Chemical under the trade name "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

A variety of hardening agents, including, but not limited to, aliphatic amines, aliphatic tertiary amines, aromatic amines, cycloaliphatic amines, heterocyclic amines, amido amines, polyamides, polyethylamines and carboxylic acid anhydrides can be utilized with the above described epoxide containing liquids. Of these, aliphatic amines, aromatic amines and carboxylic acid anhydrides are the most suitable.

Examples of aliphatic and aromatic amine hardening agents are triethylenetetraamine, ethylenediamine, N-cocoalkyltri-methylenediamine, isophoronediamine, N-aminoethylpiperazines, imidazoline, 1,2-diaminecyclohexane, diethyltoluenediamine and tris(dimethylaminomethylphenol). Examples of carboxylic acid anhydride hardening agents are methyltetrahydrophthalic anhydride, hexahydrophthalic anhydride, maleic anhydride, polyazelaic polyanhydride and phthalic anhydride. Of these, triethylenetetramine, ethylenediamine, N-cocoalkyltri-methylenediamine, isophorone diamine, diethyltoluenediamine and dimethylaminomethylphenol are preferred, with isophorone diamine, diethyltoluenediamine and tris(dimethylaminomethylphenol) being the most preferred.

One or more of the above hardening agents can be utilized in an epoxy sealant composition of this invention. The hardening agent or mixture of hardening agents is generally included in the epoxy sealant composition in an amount in the range of from about 20% to about 90% by weight of the epoxide containing liquid in the composition.

In applications where the use of a higher viscosity epoxy sealing composition is called for, i.e., a viscosity in the range of from about 90 to about 120 centipoises, an epoxy resin can be included in the epoxy sealing composition. While various epoxy resins can be used, preferred such resins are those selected from the condensation products of epichlorohydrin and bisphenol A. A particularly suitable such resin is commercially available from the Shell Chemical Co. under the trade name "EPON®RESIN 828". This epoxy resin has a molecular weight of about 340 and a one gram equivalent of epoxide per about 180 to about 195 grams of resin. An epoxide containing liquid of the type described above is utilized to modify the viscosity of the epoxy resin used and add flexibility and resiliency to the resulting composition after hardening. Generally, when an epoxy resin is included in the sealing composition, it is present therein in an amount in the range of from about 10% to about 90% by weight of the epoxide containing liquid in the composition.

The hardening agent utilized in a composition containing an epoxy resin is preferably a hardening agent or mixture of hardening agents from the group set forth above. The hardening agent is included in a composition containing an epoxy resin in an amount in the range of from about 20% to about 90% by weight of the epoxide containing liquid in the composition.

The epoxy sealing compositions of this invention can also include a particulate filler depending upon the type of openings to be sealed. For example, if the openings to be sealed are relatively large, a particulate filler is generally included in the sealant composition. Examples of suitable fillers include, but are not limited to, crystalline silicas, amorphous silicas, clays, calcium carbonate and barite. When used, the filler is present in the composition in an amount in the range of from about 10% to about 300% by weight of epoxide containing liquid in the composition.

In applications involving an aqueous or oil based completion fluid or drilling fluid, e.g., lost circulation applications, a quantity of the completion or drilling fluid is preferably mixed with the epoxy sealant composition so that it has approximately the same density as the completion or drilling fluid. The aqueous completion or drilling fluid is included in the epoxy sealant composition in an amount in the range of from about 20% to about 50% by weight of epoxide containing liquid in the composition.

In order to facilitate the dispersal of the epoxy sealant composition in an aqueous completion or drilling fluid, a water-wetting surfactant which functions as a dispersing agent is preferably also included in the sealant composition. Examples of such surfactants include ethylene glycol monobutyl ether, the sodium salt of an alpha-olefinic sulfonate and nonylphenol ethoxylated with 8–10 moles of ethyleneoxide and terminating with a sodium carboxylate group. Of these, nonylphenol ethoxylated with 8–10 moles of ethyleneoxide and terminating with a sodium carboxylate group is preferred. The surfactant used is generally included in the composition in an amount in the range of from about 2% to about 20% by weight of epoxide containing liquid in the composition.

When the epoxy sealant compositions are utilized to seal well bores penetrating subterranean lost circulation zones, the epoxy compositions can include one or more of the lost circulation materials known to those skilled in the art. Preferred such lost circulation materials include, but are not limited to, ground walnut hulls, cellophane flakes and fibrous materials.

A preferred method of this invention for sealing openings in a well bore penetrating a subterranean zone into which fluids contained in the well bore are lost or from which fluids undesirably flow into the well bore is comprised of the following steps. A hardenable epoxy composition having a selected viscosity at 25° C. in the range of from about 10 to about 100 centipoises is prepared comprised of an epoxide containing liquid selected from the group of diglycidyl ethers of 1,4-butanediol, neopentyl glycol and cylohexanedimethanol and a hardening agent. The hardening agent is at least one member selected from the group of diethyltoluenediamine, tris(dimethylaminomethylphenol) and isophoronediamine and is included in the composition in an amount in the range of from about 20% to about 35% by weight of the epoxide containing liquid in the composition. After the epoxy composition is prepared, it is placed by way of the well bore into the openings in the well bore and the subterranean zone communicated therewith. Thereafter, the epoxy composition is allowed to harden to thereby seal the well bore.

As mentioned above and depending upon the particular application involved, the epoxy composition can include an epoxy resin, a particulate filler such as crystalline silica, e.g. microsand, an aqueous completion or drilling fluid, a water-wetting surfactant and/or lost circulation material.

When the openings in the well bore are small, the step of placing the epoxy composition into the openings is preferably performed by pumping the epoxy composition into the openings and into the subterranean zone at an elevated pressure. When the openings are relatively large, the epoxy sealant composition is preferably placed in the openings and the subterranean zone by permitting the composition to flow into the openings and into the subterranean zone by hydrostatic fluid pressure differential.

In order to further illustrate the methods and compositions of this invention, the following example is given

EXAMPLE 1

A number of epoxy sealant compositions useful in accordance with this invention were prepared containing the components and in the amounts shown in the Table below. The compositions were tested for thickening times, compressive strengths, shear bond strengths and tensile strengths in accordance with the procedures set forth in *API Specification For Materials And Testing For Well Cements*, API Specification 10, 5th Edition, dated Jul. 1, 1990 of the American Petroleum Institute. The results of these tests are set forth in the Table below:

TABLE I

| EPOXY SEALANT COMPOSITION PROPERTIES | | | | | | | | |
|---|---|---|---|---|---|---|---|---|
| Sealant Composition Components | | | | | | Thickening Time To 100 Bc, hr:min | | |
| Epoxy Containing Liquid | Quantity, Grams | Hardening Agent | Quantity, Grams | Filler | Quantity, Grams | 100° F. | 150° F. | 200° F. |
| Diglycidal Ether of 1,4-Butanediol[1] | 400 | Diethyltoluenediamine[2] | 132 | Microsand | 800 | — | 10:45 | 3:45 |
| Diglycidal Ether of 1,4-Butanediol[1] | 400 | Diethyltoluenediamine[2,3] | 132 | Microsand | 800 | — | 4:00 | — |
| Diglycidal Ether of 1,4-Butanediol[1] | 400 | Isophronediamine[4] | 130 | Microsand | 800 | 2:15 | — | — |

| Compressive Strength, psi | | | Shear Bond[5] Strength, psi | | | Tensile Strength[6], psi | | |
|---|---|---|---|---|---|---|---|---|
| 100° F. | 150° F. | 190° F. | 140° F. | 240° F. | 280° F. | 140° F. | 240° F. | 280° F. |
| — | 10,300 (72 hrs) | 7,800 (24 hrs) | — | — | 103 | — | — | 176 |
| — | 3,610 (24 hrs) | — | — | 101 | — | — | 246 | — |
| 6,033 (24 hrs) | — | — | 255 | — | — | 1832 | — | — |

[1]"HELOXY ® 67" from Shell Chemmical Co.
[2]"EPI-CURE ® (R)W" from Shell Chemical Co.
[3]Composition also included 15 grams of "EPI-CURE ®" 3253 catalyst tris(dimethylaminomethylphenol) from Shell Chemical Co.
[4]"Vestamine ® IPD" from Hulls of America, Inc.
[5]Average of three cylinders cured at temperature for 72 hrs.
[6]Average of three cubes cured at temperature for 72 hrs.

From the Table, it can be seen that the epoxy sealant compositions have excellent sealing properties.

EXAMPLE 2

An epoxy sealant composition was prepared comprised of 600 grams of diglycidyl ether of cyclohexane dimethanol ("HELOXY® 107") from Shell Chemical Company), 600 grams of microsand and 140 grams of diethyltoluenediamine ("EPI-CURE®(R)W") from Shell Chemical Company). The epoxy sealant composition was allowed to harden in a cylinder for 24 hours at 250° F. The weight of the resulting hardened cylindrical composition was determined to be 272.36 grams. The cured composition was then submerged in crude oil in an autoclave at 250° F. for 72 hours. At the end of the 72 hours, the composition was rinsed with acetone and it was again weighed. The weight was determined to be 272.68 grams. Thus, the hardened epoxy sealant composition was not dissolved or otherwise weakened by prolonged contact with hot crude oil Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of sealing openings in a well bore penetrating a subterranean zone into which fluids contained in the well bore are lost or from which fluids undesirably flow into the well bore comprising the steps of:
   (a) preparing a hardenable epoxy composition having a viscosity at 25° C. in the range of from about 10 to about 100 centipoises comprising an epoxide containing liquid selected from the group of the diglycidyl ether of 1,4-butanediol, the diglycidyl ether of neopentyl glycol and the diglycidyl ether of cyclohexane dimethanol, a particulate filler and a hardening agent;
   (b) placing said epoxy composition by way of said well bore into said openings and into said subterranean zone; and
   (c) allowing said epoxy composition to harden.

2. The method of claim 1 wherein said hardening agent is at least one member selected from the group of aliphatic amines, aromatic amines, and carboxylic acid anhydrides.

3. The method of claim 1 wherein said hardening agent is at least one member selected from the group of triethylenetetramine, ethylenediamine, N-cocoalkyltrimethylenediamine, isophoronediamine, diethyltoluenediamine and tris(dimethylaminomethylphenol) and is present in said composition in an amount in the range of from about 20% to about 90% by weight of said epoxide containing liquid in said composition.

4. The method of claim 1 wherein said filler is selected from the group consisting of crystalline silicas, amorphous silicas, clays, calcium carbonate and barite.

5. An improved method of sealing openings in a well bore penetrating a subterranean zone into which fluids contained in the well bore are lost or from which fluids undesirably flow into the well bore comprising the steps of:
   (a) preparing a hardenable epoxy composition having a viscosity at 25° C. in the range of from about 10 to about 100 centipoises comprising an epoxide containing liquid selected from the group of the diglycidyl ether of 1,4-butanediol, the diglycidyl ether of neopentyl glycol and the diglycidyl ether of cyclohexane dimethanol, an aqueous completion or drilling fluid present in said composition in an amount in the range of from about 20% to about 50% by weight of said epoxide containing liquid in said composition and a hardening agent;
   (b) placing said epoxy composition by way of said well bore into said openings and into said subterranean zone; and
   (c) allowing said epoxy composition to harden.

6. The method of claim 5 wherein said composition further includes a surfactant selected from the group of ethylene glycol monobutyl ether, the sodium salt of an alpha-olefinic sulfonate and nonylphenol ethoxylated with 8–10 moles of ethylene oxide and terminating with a sodium carboxylate group present in said composition in an amount in the range of from about 2% to about 20% by weight of epoxide containing liquid in said composition.

7. The method of claim 1 wherein said epoxy composition further comprises an epoxy resin comprised of epichlorohydrin and bisphenol A present in an amount in the range of from about 10% to about 90% by weight of epoxide containing liquid in said composition.

8. The method of claim 1 wherein said epoxy composition is placed in accordance with step (b) by pumping said composition into said openings and into said subterranean zone at an elevated pressure.

9. The method of claim 1 wherein said epoxy composition is placed in accordance with step (b) by permitting said composition to flow into said openings and into said subterranean zone by hydrostatic fluid pressure differential.

10. The method of claim 5 wherein said hardening agent is at least one member selected from the group of aliphatic amines, aromatic amines, and carboxylic acid anhydrides.

11. The method of claim 5 wherein said hardening agent is at least one member selected from the group of triethylenetetramine, ethylenediamine, N-cocoalkyltrimethylenediamine, isophoronediamine, diethyltoluenediamine and tris(dimethylaminomethylphenol) and is present in said composition in an amount in the range of from about 20% to about 90% by weight of said epoxide containing liquid in said composition.

12. The method of claim 5 wherein said epoxy composition further comprises a particulate filler.

13. The method of claim 12 wherein said filler is selected from the group consisting of crystalline silicas, amorphous silicas, clays, calcium carbonate and barite.

14. An improved method of sealing relatively large openings in a well bore penetrating a subterranean zone into which fluids contained in the well bore are lost comprising the steps of:
   (a) preparing a hardenable epoxy sealing composition having a viscosity at 25° C. in the range of from about 10 to about 100 centipoises and having flexibility upon hardening comprising an epoxide containing liquid selected from the group of the diglycidyl ether of 1,4-butanediol, the diglycidyl ether of neopentyl glycol and the diglycidyl ether of cyclohexane dimethanol, an epoxy resin compound of epichlorohydrin and bisphenol A present in an amount in the range of from about 10% to about 90% by weight of epoxide containing liquid in said composition and a hardening agent;
   (b) permitting said epoxy composition to flow by hydrostatic fluid pressure differential into said openings and into said subterranean zone; and
   (c) allowing said epoxy composition to harden.

15. The method of claim 14 wherein said hardening agent is at least one member selected from the group of aliphatic amines, aromatic amines, and carboxylic acid anhydrides.

16. The method of claim 14 wherein said hardening agent is at least one member selected from the group of triethylenetetramine, ethylenediamine, N-cocoalkyltrimethylenediamine, isophoronediamine, diethyltoluenediamineand tris(dimethylaminomethylphenol) and is present in said composition in an amount in the range of from about 20% to about 90% by weight of said epoxide containing liquid in said composition.

17. The method of claim 14 wherein said epoxy composition further comprises a particulate filler.

18. The method of claim 17 wherein said filler is selected from the group consisting of crystalline silicas, amorphous silicas, clays, calcium carbonate and barite.

19. The method of claim 14 wherein said epoxy composition further comprises aqueous drilling fluid present in said composition in an amount in the range of from about 20% to about 50% by weight of said epoxide in said composition.

20. The method of claim 19 wherein said composition further includes a surfactant comprising nonylphenol ethoxylated with 8–10 moles of ethylene oxide and terminating with a sodium carboxylate group present in said composition in an amount in the range of from about 2% to about 20% by weight of epoxide containing liquid in said composition.

21. The method of claim 14 wherein said epoxy composition further comprises a lost circulation material.

22. The method of claim 21 wherein said lost circulation material is selected from the group consisting of ground walnut hulls, cellophane flakes and fibrous materials.

* * * * *